United States Patent

[11] 3,588,075

[72] Inventor Carl Ullrich Peddinghaus
 Ob. Lichtenplatzer Str. 268, Wuppertal-Barmen, Germany
[21] Appl. No. 758,929
[22] Filed Sept. 6, 1968
[45] Patented June 28, 1971
[32] Priority Sept. 9, 1967
[33] Germany
[31] P 16 25 418.5

[54] LOAD BEARING ASSEMBLY
 13 Claims, 1 Drawing Fig.
[52] U.S. Cl............................................. 267/121, 267/34
[51] Int. Cl............................................. F16f 5/00
[50] Field of Search................................ 267/34, 121, 178

[56] References Cited
UNITED STATES PATENTS
2,325,430 7/1943 Setz.............................. 267/34
3,263,983 8/1966 Bliven........................... 267/34

Primary Examiner—James B. Marbert
Attorney—Holman & Stern

ABSTRACT: A load-bearing assembly having a tubular body provided with two axially spaced guide elements, and a shock absorber including a cylinder slidable in the guide elements and having a closed end which extends towards one end of the tubular body and a piston rod which extends from the other end through sealing means in the body, means for securing the extended portion of the piston rod relative to the body and resilient means for biasing the cylinder towards the first named end of the tubular body for sustaining the load to be borne.

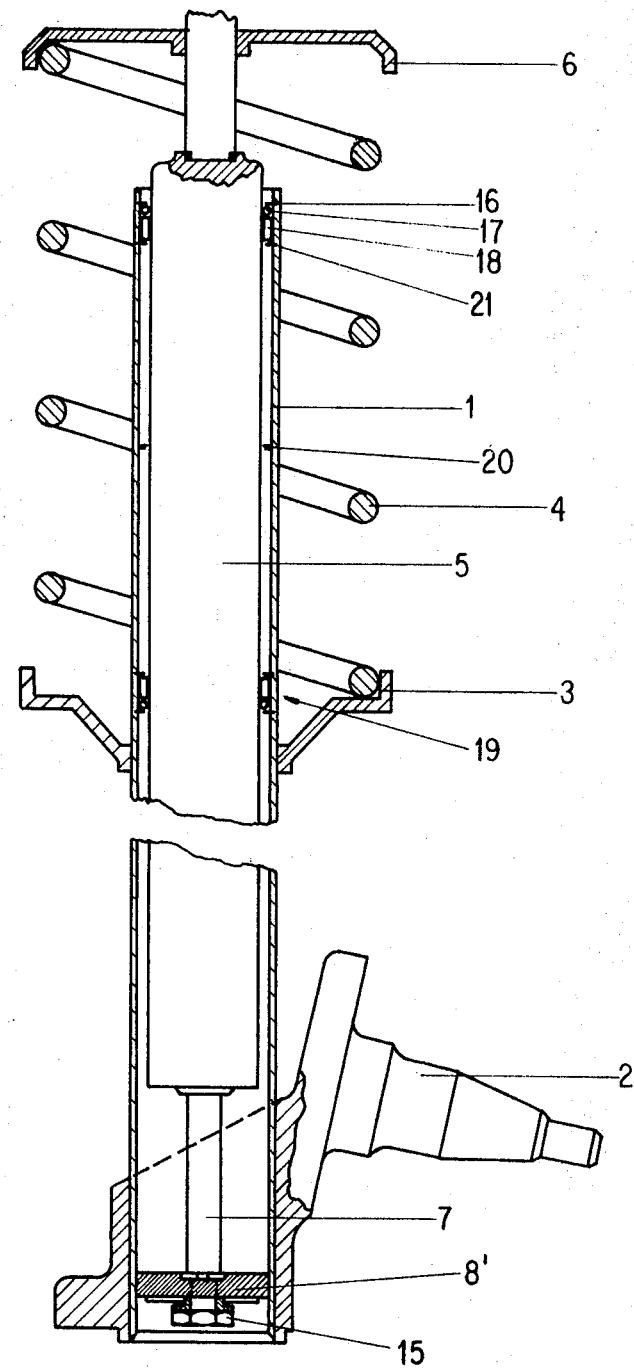

LOAD BEARING ASSEMBLY

The invention relates to load bearing structures of the type incorporating shock absorbers.

It is among the objects of the invention to provide a load-bearing structure of this type which is not excessively heavy and difficult to handle, and which allows ease of access to the shock absorber for servicing and repairs.

The invention therefore provides a load assembly, comprising a tubular body having at least two axially spaced guide elements therein, a shock absorber comprising a cylinder slidable in the guide elements and having one end closed and extending towards one end of the tubular body, a piston rod extending from the other end of the cylinder through sealing means therein towards the other end of the tubular body, means securing the extending portion of the piston rod in relation to the tubular body, and resilient means disposed so as to bias the cylinder towards the first-mentioned end of the tubular body for sustaining the load to be borne.

Conveniently, the shock absorber is detachably connected to the tubular body, so that it is possible, for example, if preliminary wear of the shock absorber should occur, to effect its removal from the structure and replace the shock absorber by a spare. As the shock-absorbing liquid is enclosed in the shock absorber, it is only necessary to use a small quantity of shock-absorbing liquid with a consequent appreciable limitation in weight. It is particularly advantageous to detachably connect the piston rod of the shock absorber to the tubular body, for example, by a threaded engagement. In this way, it is not necessary to provide a tight sealing closure of the base of the tubular body which may be arranged with advantage to be open at at least one of its ends.

It is also possible to use a shock absorber including a volume of compressed gas which constitutes the resilient means.

A lubricant may be provided outside of the cylinder so as to lubricate the guide elements, as it is desirable that the shock-absorbing liquid itself should not be used for this purpose. This arrangement has the additional advantage that the shock-absorbing liquid can be chosen for the purpose in hand; thus, a liquid having a temperature-insensitive coefficient of viscosity may be used as a shock-abosrbing liquid while special lubricants are used for the lubrication. This lubricant is, conveniently, located in the annular space between the upper most and lower most guide elements. When a liquid lubricant entailing spacial advantages is used, a seal is arranged below the lower and above the upper guide element respectively. A liquid lubricant has two advantages, firstly in that it readily wets the guide surfaces and secondly in that it promotes thermal exchange as a result of conventional movements, so that the guides are prevented from becoming heated.

The lubricants need only occupy a part of the annular space defined between the lower and the upper guide elements. In this way the lubricants can freely expand when heated. The lubrication of both the upper and the lower guides is possible by reason of the fact that, even when the annular gap is only partially filled with lubricant. In the case of an obliquely positioned load bearing structure, as is commonly the case in motor vehicles, the meniscus of the liquid will be oblique and will generally reach as far as the upper guide, as a result of movements of the structure.

One embodiment of the invention is described below with reference to the accompanying drawings.

In the drawing there is shown a load-bearing structure comprising a tubular body 1 having its lower end secured to a member which in the drawing is an axle bolt 2.

Mounted within the tubular body 1 at upper and midpositions thereof are two annular slide bearings 18 and 19 respectively, made of porous sintered material which can be permeated by a lubricant. Sealing rings 17 are provided above and below the slide bearings 18 and 19 respectively for a purpose to be late explained. At each of the bearing positions, the slide bearing and the sealing ring are retained against axial movement by a pair of resilient retaining rings 16 and 21 respectively.

Liquid lubricant is provided between the slide bearings 18 and 19 up to a level 20 and is retained by the sealing rings 17.

A cylinder 5 of a shock absorber is mounted within the tubular body 1 for sliding movement in the slide bearings. The upper end of the cylinder 5 is closed and has a rod extending therefrom which normally carries the weight to be supported and which has secured thereon a dished plate 6.

A dished annulus 3 is provided on the outer surface of the tubular body 1 at a midposition thereof and a coil spring 4 is disposed between the annulus 3 and the plate 6. The spring 4 is sufficiently strong to support the weight to be carried.

At the lower end, the cylinder 5 has a sealing element through which a piston rod 7 extends. The outer end of the piston rod 7 is screw threaded and secured by a nut 15 to a base attachment 8 located in the tubular body 1.

A number of alternative features may be included in the constructions if desired.

Thus, the dished annulus and plate 3 and 6 and the spring 4 may be supplemented or obviated by providing a shock absorber in which a volume of compressed gas is enclosed, and the gas pressure being is determined by the load that the structure has to carry. Alternatively, a volume of compressed gas may be provided within the tubular body 1 beneath the lower sealing ring 17. In this case, the base attachment 8' is formed as a tight sealing base plate to the tubular body 1 in order to contain the gas.

The bearings 18 and 19 may be of the other forms such as, for example, ball bearings retained in a cage, and the resilient retaining rings 16 maybe replaced by annular beads formed on the inner surface of the tubular body.

In order to retain the lubricant in the annular space, a capillary system, for example, in the form of a web of textile material, maybe provided which retains the lubricant and tends to check loss of the lubricant when wear of the sealing rings 17 takes place.

I claim:

1. A load-bearing assembly, comprising a tubular body having at least two axially spaced guide elements therein, a shock absorber defined by a cylinder having a closed end and a cylindrical piston rod extending from the other end thereof, said cylinder being slidable in said guide elements with the closed end extending toward one end of the tubular body, the outer periphery of the cylinder and the inner periphery of the tubular body constituting an annular space between the guide elements, sealing means in the tubular body toward the other end thereof through which the piston rod extends, means securing the extended portion of the piston rod in relation to the tubular body, resilient means disposed so as to bias the cylinder toward said one end of the tubular body for sustaining the load to be borne, sealing elements located under the lowermost guide element and above the uppermost guide element, respectively, and a liquid lubricant within the annular space for lubricating the guide elements.

2. The load-bearing structure according to claim 1, wherein the shock absorber is detachably connected to the tubular body.

3. The load-bearing structure according to claim 2, wherein the shock absorber is detachably connected to the tubular body be means of the piston rod.

4. The load-bearing structure according to claim 1, wherein the tubular body is open at at least one end thereof.

5. The load-bearing structure according to claim 1, wherein the shock absorber includes a volume of compressed gas comprising the resilient means.

6. The load-bearing structure according to claim 1, wherein the lubricant only occupies part of the annular space between the guide elements.

7. The load-bearing structure according to claim 1, wherein the guide elements comprise bearings capable of being saturated by the lubricant.

8. The load-bearing structure according to claim 1, wherein means are provided for restraining the guide elements and the sealing elements against axial movement in the tubular body.

9. The load-bearing assembly according to claim 8, wherein said restraining means comprise beads formed on the inner surface of the tubular body.

10. The load-bearing structure according to claim 8, wherein said restraining means comprise resilient rings lodged in annular grooves on the inside of the tubular body.

11. The load-bearing structure according to claim 6, wherein the liquid lubricant in the annular space between the guide elements is carried by a capillary system.

12. The load-bearing structure as claimed in claim 11, wherein the capillary system comprises a web of textile material.

13. The load-bearing structure according to claim 6, wherein the resilient means comprises a quantity of compressed gas disposed beneath the lower sealing element, the gas containing space being defined by the cylinder, the lower sealing element, the tubular body and a lower wall of the tubular body.